United States Patent [19]

Betts et al.

[11] 4,382,112
[45] May 3, 1983

[54] FLEXIBLE INSULATION WITH IMPROVED DISCOLORATION AND HEAT AGE RESISTANCE

[75] Inventors: Joseph E. Betts, Westport; Joseph E. Vostovich, Bridgeport, both of Conn.; Kenneth R. Curtis, Nashua, N.H.

[73] Assignee: General Electric Company, New York, N.Y.

[21] Appl. No.: 280,966

[22] Filed: Jul. 7, 1981

[51] Int. Cl.³ .......................................... B32B 15/02
[52] U.S. Cl. .................................. 428/379; 428/461; 428/462; 428/391; 428/447; 524/81; 524/93; 524/432; 524/526; 524/527; 525/213

[58] Field of Search ................. 260/28.5 A; 525/213, 525/236; 524/430, 432, 93, 437, 526, 527; 428/379, 461, 462, 391, 447, 450

[56] References Cited

U.S. PATENT DOCUMENTS 3,816,347  6/1974  Luh ...................................... 525/214
4,125,509  11/1978  Vostovich ................. 260/33.6 AQ Primary Examiner—Theodore E. Pertilla
Attorney, Agent, or Firm—Paul E. Rochford

[57] ABSTRACT

Chlorinated polymers are employed within flexible wire insulation coatings to improve the insulation properties of the coating and to increase the coating's discoloration resistance.

5 Claims, 1 Drawing Figure

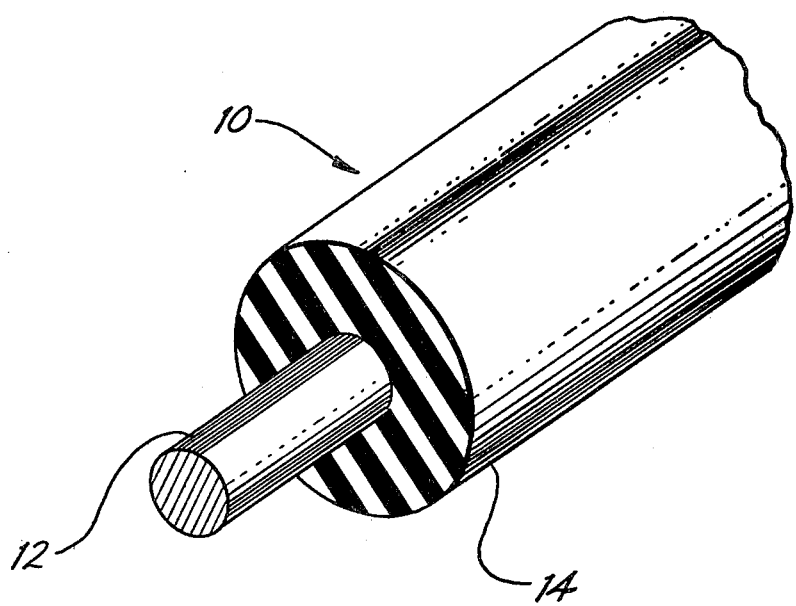

FLEXIBLE INSULATION WITH IMPROVED DISCOLORATION AND HEAT AGE RESISTANCE

The present invention relates to flexible insulation for wire and, more specifically, to improvements in the insulation to increase the resistance of the insulation to discoloration and to wire products formed with such insulation coatings.

BACKGROUND OF THE INVENTION

Flexible insulation is formed on wire and cable products by use of flexible base polymers such as ethylene-propylene-diene terpolymer, also known as EPDM. This EPDM is the ASTM designation for an ethylene-propylene terpolymers or a quatrepolymer. Two such quatrepolymers are the polymer products sold commercially as Nordel 2722 of DuPont and Nordel 2522 of DuPont. Other ethylene-propylene copolymers, terpolymers and quatrepolymers may be used in place of the specific EPDMs such as the Nordel 2000 Series of DuPont. Further illustrations of ethylene-propylene polymers which have been used in flexible insulation for wire and cable include the Vistalon 404 of the Exxon Chemical Americas Company, which is an ethylene-propylene copolymer. Further, the Nordel 1040, for example, and Nordel 1145 of the DuPont Company have been employed in making flexible wire insulation for wire and cable products. These latter DuPont products are ethylene-propylene terpolymers.

The above and similar flexible polymers compositions have been incorporated as the base polymer of flexible wire insulation. Such flexible wire insulation has been used in the temperature ranges of a 90° C. wire rating, and a 105° C. wire rating and some of them up to a 125° C. wire rating, according to applicable UL standards. One of the problems which such compositions encounter as the compositions are employed at higher temperatures, is that there is a tendency for the compositions to discolor. In other words, as a generality, the compositions of flexible wire insulation which have the ethylene-propylene copolymer, terpolymer or quatrepolymer bases do have a tendency to discolor as the temperature of use or temperature of test of the compositions is raised. This tendency is present even though the compositions themselves may have some ingredients which permit them to be used at more elevated temperatures. For example, the composition of U.S. Pat. No. 4,125,509 does have substantial resistance to discoloration at relatively short test periods of about five hours. The composition of the U.S. Pat. No. 4,125,509 patent does have deteriorating properties when operated continuously at a 150° C. range even though it does not discolor for short periods at this temperature.

As a general rule, it is desirable for a composition to have relatively high temperature operating capability without serious impairment of the performance characteristics of the insulation and without serious color changes. Some color changes are not associated with deterioration of performance characteristics but the end user or customer of the product may associate performance characteristic changes with the changes in color and, accordingly, from a customer's point of view, it is desirable that color deterioration be avoided where feasible.

It has now been discovered that through a relatively minor change in the composition of a flexible wire insulation material that the tendency toward discoloration of the composition from test or use at elevated temperatures can be inhibited and further that, in some instances, the avoidance of color deterioration can be accompanied by improved properties.

OBJECTS OF THE INVENTION

It is accordingly one of the objects of the present invention to provide a composition which has improved resistance to discoloration.

Another object of the invention is to provide a wire product coated with a wire insulation having improved resistance to discoloration.

Another object is to provide a novel method of improving the resistance to color deterioration of flexible wire insulation.

Another object is to provide a flexible wire insulation having an ethylene-propylene copolymer, terpolymer or quatrepolymer base which has improved resistance to discoloration on heating at elevated temperatures.

Still another object is to provide a wire insulation and wire product which has a greater resistance to discoloration from other causes over a period of time as by exposure to sunlight and the like.

A further object is to provide a wire insulation and wire product having a flexible insulation which has improvements in properties of the composition on heating or exposure to other discoloration influences, and which nevertheless has also improved combination of properties in addition to the discoloration resistance.

Still other objects will be in part apparent and in part more pointed out in the description which follows.

DESCRIPTION OF THE FIGURE

The drawing comprises a perspective view of an insulated conductor comprising a metallic element having a flexible polyolefin insulation thereabout.

BRIEF STATEMENT OF THE INVENTION

Improvements in the discoloration resistance and other properties at 150° C. are achieved in an insulation composition having an ethylene-propylene copolymer, terpolymer or quatrepolymer base and having two antioxidants present, one of which is ZMB and the other being Irgonox, by the addition of a relatively small quantity of a chlorinated polymer. The chlorinated polymer which is suitable for practice of the present invention may be chlorinated polyethylene or other saturated chlorinated polymer free of sulfur which is compatible and blendable with the ethylene-propylene copolymers and terpolymers and quatrepolymers of the flexible wire insulation composition for which improvement is sought.

It has also been discovered that a unique improvement in the properties, such as heat aging, of such base materials other than improvement in discoloration resistance are achieved by the incorporation of the chlorinated compatible polymer in the base polymer composition.

DESCRIPTION OF THE PREFERRED EMBODIMENTS

In carrying out the present invention, a base polymer composition containing the ethylene-propylene copolymer, terpolymer or quatrepolymer is blended with a relatively small amount of a saturated chlorinated compatible polymer which is free of sulfur and the base material containing chlorinated polymer is formulated into a wire coating composition.

The polymer base ingredients which may be employed include the ethylene-propylene copolymers as well as the ethylene-propylene terpolymers and particularly those ethylene-propylene diene terpolymers which have relatively high degree of flexibility and which are suitable for use as wire coating insulation compositions. Also, the ethylene-propylene quatrepolymer materials are included within the group of base polymer materials for which improvement is sought.

The chlorinated polymer which may be added to the original base polymer should be one which is free of sulfur constituents and accordingly Hypalon is not suitable for this purpose. Also, it has been found that the chlorinated polymer additive must be saturated as well as chlorinated and accordingly Neoprene, which is chlorinated but unsaturated, is unsatisfactory for this purpose. Chlorinated polyethylene is both saturated and free of sulfur and may be employed as well as chlorinated ethylene-propylene copolymer, or similar chlorinated polymer compositions. The chlorinated polymer additive must also be compatible with the base polymer and, accordingly, the use of vinyl chloride, for example, which is generally not by itself compatible with the ethylene-propylene copolymers, is not suitable. A preferred material is chlorinated polyethylene.

The composition containing the base polymer and the chlorinated polymer additive may also contain the additives which are employed in enhancing the combination of properties of such polymer base materials when employed as wire insulation compositions. For example, antioxidant additives as well as crosslinking additives and pigmenting additives may be employed. In addition, mineral fillers, processing aids, crosslinking co-agents and the like may be employed.

As a specific example of the composition which has been used successfully in connection with the present invention, there is given here a combination of ingredients which produces desirable results.

The ingredients as listed under the heading "Preferred Range" in Table I were blended in a Banbury at an elevated temperature with the Vue-cup R organic peroxide ingredient omitted. Following the blending, a second mix was made in which the temperature of the composition was below the decomposition temperature of organic peroxide and the organic peroxide was blended into the lower temperature composition.

After the peroxide was thoroughly blended into the composition, the composition was extruded onto a wire and the extrusion coating was heated at an elevated temperature above the decomposition temperature of the peroxide to cause a crosslinking of the polymer constituents of the blend.

The wire product obtained as described above was subjected to testing and it was found that after five hours of air oven heating at 150° C., a composition as prepared according to the preferred example remained essentially white and did not undergo any appreciable color change.

A control composition containing Hypalon in place of the chlorinated polyethylene was prepared by essentially the same procedure. It was then heated for five hours in an air oven at 150° C. The heated composition had developed a tan coloration which was readily evident by side-by-side comparison of the heated Hypalon containing wire with a sample of the same wire prior to heating.

By contrast, the wire sample which was prepared according to the preferred example in Table I remained white after five hours of air oven heating at 150° C. so that a side-by-side comparison of the wire prior to heating and after heating showed that the amount of discoloration was barely observable, but for practical purposes, the discoloration was negligible.

It was also observed that the composition of the preferred range of Table I had better heat aging characteristics over the composition which employed the Hypalon in place of the chlorinated polyethylene. In this connection, the composition containing the Hypalon possessed marginal elongation retention values after testing according to the Canadian Standards Association standards of heat aging at 158° C. for seven days in an air oven. The minimum elongation retention value permissible to pass this test is 70% minimum elongation retention. As stated, the composition containing Hypalon possessed marginal elongation retention values.

However, a sample identified as ID-80-142F, having 8 parts of chlorinated polyethylene in place of 8 parts of Hypalon, had an elongation retention value of 76% after performing the Canadian Standards test of heat aging at 158° C. in an air oven for 7 days. Accordingly, the composition prepared with the ingredients as set out in Table I under the Preferred Range was improved where the composition contained 8 parts of chlorinated polyethylene as contrasted with 8 parts of Hypalon. The heat aging characteristics of the preferred range compositions are improved sufficiently to pass the CSA aging standard whereas the composition containing the Hypalon does not pass this test with any reliability or safety margin.

Further, it was observed that after a four-month test of the composition as prepared with the preferred range of constituents set out in Table I, with the sunlight coming through a window, there was no perceptible change in color of the compound incorporating the chlorinated polyethylene after the four months of testing. The particular chlorinated polyethylene employed was CPE 674 as supplied by Dow Chemical Company.

TABLE I

| | PREFERRED RANGE PARTS | OPERABLE RANGE PARTS |
|---|---|---|
| Ethylene-Propylene Polymer | | |
| Nordel 2722 EPDM | 95–70 | |
| Nordel 2522 EPDM | 5–30 | |
| Compatible Chlorinated Polymer | | 4–12 |
| Chlorinated Polyethylene | 6–10 | |
| C710 Alumina | 75–130 | 50–150 |
| Zinc Oxide | 10–25 | 5–30 |
| Parafin Wax | 2–7 | 0–10 |
| Antioxidant | | 2–10 |
| Vulkanox ZMB-2* | 3–6 | |
| Irgonox 1010** | 1.5–3 | |
| Vinyl Silane Linking Aid | 1–2 | 0.5–3 |
| Peroxide Crosslinking Agent | | 1.5–8 |
| Vul-Cup R*** | 2–4 | |
| Titanium Dioxide | 0–5 | 0–10 |

*Vulkanox ZMB-2: zinc salt of a blend of 4- and 5-methylmercapto benzimidazole.
**Irgonox 1010: Tetrakis [methylene 3-(3',5'-di-tert-butyl-4'-hydroxyphenyl)propionate] methane.
***Vul-Cup R: α,α'-bis,(t-butylperoxy)diisopropylbenzene.

Nordel 2722 EPDM and Nordel 2522 EPDM are elastomer polymer products available under the stated designation from the DuPont Company. Alumina C710 is a commercially available aluminum oxide product available from Alcoa (Aluminum Company of America) Corporation.

Where a component is listed in parts by weight with a range of parts starting with zero parts, it is an optional component.

The composition prepared according to the present invention may be extruded prior to curing onto wire as an insulating coating thereon. Following such extrusion, the coating may be heated under pressure to cause decomposition of the peroxide and to cause chemical crosslinking of the insulating coating by methods well known in the art.

Alternatively, the peroxide ingredient of the composition may be omitted and high energy radiation, such as high energy electrons, can be employed to cause crosslinking and curing of the coating composition also by methods well known in the art.

In the figure, there is illustrated a central conductor 12 about which has been formed an insulating layer 14 prepared pursuant to the present invention. The insulating layer 14 may be in the curable state or may be in the cured state. Also, the cured insulation may be chemically cured or cured by high energy radiation. The product illustrated is an insulated conductor 10, the conductor of which may be solid as illustrated or stranded.

What we claim as new and desire to secure by Letters Patent of the United States is:

1. A curable composition having improved resistance to discoloration comprising the following combination of ingredients;

| INGREDIENT | PARTS |
| --- | --- |
| Ethylene-Propylene Polymer | 100 |
| Compatible Chlorinated Polymer | 4–12 |
| Alumina | 50–150 |
| Zinc Oxide | 5–30 |
| Parafin Wax | 0–10 |
| Antioxidant | 2–10 |
| Vinyl Silane Linking Aid | 0.5–3 |
| Peroxide Crosslinking Agent | 1.5–8 |
| Titanium Dioxide | 0–10. |

2. A cured composition having improved discoloration resistance after curing which comprises the following combination of ingredients:

| INGREDIENT | PARTS |
| --- | --- |
| Ethylene-Propylene Polymer | 100 |
| Compatible Chlorinated Polymer | 4–12 |
| Alumina | 50–150 |
| Zinc Oxide | 5–30 |
| Parafin Wax | 0–10 |
| Antioxidant | 2–10 |
| Vinyl Silane Linking Aid | 0.5–3 |
| Peroxide Crosslinking Agent | 1.5–8 |
| Titanium Dioxide | 0–10. |

3. A wire product having the curable composition of claim 1.

4. The cured product of claim 3.

5. A curable composition having improved resistance to discoloration which comprises the following combination of ingredients:

| INGREDIENT | PARTS |
| --- | --- |
| Ethylene-propylene EPDM elastomer polymers | 100 |
| Compatible chlorinated polymer | |
| Chlorinated polyethylene | 6–10 |
| Aluminum oxide | 75–130 |
| Zinc oxide | 10–25 |
| Parafin wax | 2–7 |
| Antioxidant | |
| Zinc salt of a blend of 4- and 5-methyl mercaptobenzimidazole | 3–6 |
| Tetrakis methane | 1.5–3 |
| Vinyl Silane Linking Aid | 1–2 |
| Peroxide Crosslinking Agent α,α'-bis,(t-butyl peroxy) diiso-propyl benzene | 2–4 |
| Titanium dioxide | 0–5 |

* * * * *